2,880,060
Patented Mar. 31, 1959

2,880,060

SEPARATION OF NIOBIUM AND TANTALUM VALUES

Neva L. Campbell, Cleveland, and Ronald C. Vickery, Novelty, Ohio, assignors to Horizons Incorporated, Princeton, N.J., a corporation of New Jersey No Drawing. Application February 28, 1957
Serial No. 642,940

9 Claims. (Cl. 23—16)

This invention relates to a process for the treatment of materials containing tantalum and niobium with a view to effecting the separation of the niobium from the tantalum by a simple and direct procedure.

The elements tantalum and niobium usually occur together in natural ores and have been found difficult to separate from one another because of the similarity in their chemical properties. Among the methods of separation which have been developed are methods in which the mixture of their oxides obtained as a result of refining the ores is dissolved in suitable solvents, such as aqueous mixtures of hydrofluoric and nitric or sulfuric acids. From the resulting aqueous solution the tantalum is precipitated as an insoluble complex fluoride while the niobium remains in solution in accordance with the classical separation developed by de Marignac.

In another scheme of separation, the ore is attacked by fusion with an acid or alkaline material, usually sodium pyrosulfate and caustic soda respectively. Again, the product must be placed in aqueous solution in order to effect the desired separation. Thus the separation of tantalum from niobium by fusion with caustic potash (KOH) is described in United States Patent 1,905,882, issued April 25, 1933. After the fusion is complete the product is leached with water, thereby separating the soluble niobates and tantalates from many of the associated elements. Thereafter the columbium and tantalum are separated by means of the difference in solubility of their complex fluorides.

Another approach, described in United States Patent 1,908,473, which issued May 9, 1933, involves first, chlorination of a mixture of comminuted ore and charcoal at temperatures of between 900 and 1000° C., conversion of the recovered chlorides to oxides, and then fusion of the oxides so obtained with potassium hydroxide. The resulting residue when dissolved in water contains the niobium as a hexaniobate and the tantalum as a hexatantalate, as well as numerous other soluble impurities. Separation of the niobium from the tantalum is achieved by addition of carbon dioxide or a bicarbonate to the solution.

In still other methods taught in the prior art, the tantalum- and niobium-bearing minerals are fused with a reducing agent in the presence of iron to form a ferroalloy enriched in niobium and a slag enriched in tantalum.

Still other suggested procedures include selective chlorination after nitriding (U.S. Patent 2,427,360); or after reduction (U.S. Patent 2,443,254) or in the presence of a base which is intended to fix the tantalum during chlorination of the niobium (U.S. Patent 2,429,671). Each of these methods involves a costly and tedious preliminary treatment, and a subsequent reprocessing of the residue to recover the niobium left behind with the tantalum.

In contrast with these involved and expensive prior art techniques, we have found that ores or concentrates or other mixtures containing tantalum and niobium as oxides, may be processed to effect the separation of tantalum from niobium by direct treatment with an alkali metal acid fluoride and preferably with potassium acid fluoride in the manner about to be described.

Briefly, our invention comprises a process for the treatment of materials containing tantalum and niobium for obtaining a separation of the niobium from the tantalum in which the primary material containing tantalum and niobium is mixed with a fluoride material of the group consisting of the alkali metal bifluorides and ammonium bifluoride, and the mixtures of these bifluorides with one another or with alkali metal normal fluorides; the mixture is heated for a time sufficient to convert the niobium to a water soluble complex fluoride and the tantalum to a less soluble complex fluoride and then the niobium and tantalum are separately recovered as the two fluorides.

The ore, or other raw material, is preferably comminuted to a suitable size. For example, by crushing the ore to minus 200 mesh (Tyler Standard) the surface exposed is sufficiently increased to permit a rapid and effective attack when heated with the acid fluoride.

The acid fluorides which may be used will depend to a large extent on the desired end product. Where the oxide of tantalum or niobium is desired, it is possible to use any of the alkali metal acid fluorides or ammonium bifluoride. Where the fluoride or oxyfluoride is the desired end product it is preferable to use potassium bifluoride in the opening of the ore. Instead of treatment with one or more of the alkali metal acid fluorides it is also within the scope of our invention to use mixtures of an alkali metal acid fluoride with a normal alkali metal fluoride since this may in some instances prove to be more economical than treatment with the bifluorides alone.

The acid fluoride and the material from which the tantalum and niobium values are to be separately recovered are formed into a mixture by blending in any conventional mixing device. For example, in the laboratory the acid fluoride and comminuted ore may be sufficiently intermixed by means of a spatula and in larger batches a paddle may be used instead. Obviously, the optimum proportions will vary with the composition of the starting materials and the manner in which they are processed. We have found that the proportion of acid fluoride to comminuted ore should range between 2 parts by weight of acid fluoride to 10 parts by weight of acid fluoride for each part by weight of comminuted ore. When using $KHF_2$ an optimum proportion of acid fluoride to ore has been found to be 3 parts by weight of $KHF_2$ for each part by weight of ore.

Once the ingredients have been suitably mixed, they are heated in an open crucible to a temperature slightly above the melting point of the acid fluoride employed. For purposes of illustration, we will describe our invention with potassium acid fluoride ($KHF_2$) as the bifluoride employed in processing the ore although it will be understood by those skilled in the art that other alkali metal bifluorides, including ammonium bifluoride, may be substituted for the potassium acid fluoride, or that mixtures of the alkali metal bifluorides may be substituted, or even mixtures of alkali metal fluorides and alkali metal bifluorides may be used. When using potassium acid bifluorides ($KHF_2$), the mixture is heated to a temperature of about 300° C. As the temperature is increased above the melting point of $KHF_2$ (239° C.), the mixture tends to become pasty and various volatile fluorides or other gaseous products tend to escape as bubbles from the pasty reaction mass. While we do not want to be bound by any particular theory, we believe that as the temperature is increased above the melting point of the bifluoride, the bifluoride tends to decompose into HF and the normal alkali fluoride. The HF then is available for direct reaction with the various oxides which are present in the material from which the tantalum and niobium are to be separately recovered. In this way such impurities as silicon are rapidly eliminated as the volatile $SiF_4$. The reaction mixture may be heated to increasing temperatures up to the temperature at which the pasty mass becomes a fluid melt, for instance about 850° C., but we have found that the reaction proceeds as completely and substantially as rapidly at temperatures of between 400 and 450° C. as at higher temperatures. Therefore, no real advantage exists in furnishing the additional heat necessary to completely fuse the mixture and we prefer to operate at temperatures below 450° C. for reasons of economy.

The mixture should be held at the elevated temperature selected for a time sufficient to convert substantially all of the niobium and tantalum values in the material being processed to fluorine-containing compounds. For the materials investigated, which are described below, a reaction time of about one hour was found to suffice. Obviously, somewhat longer or shorter times at the elevated temperature may be used according to the specific materials being reacted.

After the desired metal values have been converted to fluorine-containing compounds, the separation of the niobium and tantalum is then effected in a very simple manner. In accordance with our invention, the residue remaining after the heating step is treated with limited amounts of water, sufficient to dissolve all of the niobium present in the mixture but insufficient to dissolve any of the relatively insoluble tantalum fluoride present. As a result, the original material is separated into two fractions, one an aqueous solution of the niobium as a complex fluoride and the other a solid residue containing the tantalum as $K_2TaF_7$. Substantially all of the other elements present in the ore remain associated with the insoluble tantalum fraction and in this manner any iron, manganese, silicon, tin, titanium and vanadium which have not been expelled as volatile fluorides are separated to a large extent from the niobium.

To obtain the niobium compound in even purer form, it is recovered from the aqueous solution by crystallization in a manner well known in the art, either by cooling the original hot concentrated solution to a temperature at which the complex fluoride crystallizes or by evaporating the solution to a sufficiently concentrated state and thereafter cooling. To further purify the niobium compound, the crystallized product obtained from the preceding step may be re-dissolved in pure hot water and re-crystallized therefrom.

The tantalum may be recovered from the associated waste material by means well known in the art and this recovery forms no part of the present invention. The following specific examples will serve to further illustrate our invention.

Example 1

A Nigerian ore of niobium which contained by weight 67.7% $Nb_2O_5$; 6.38% $Ta_2O_5$; 1.42% $SnO_2$; 0.6% $TiO_2$; 0.43% $WO_3$; 2.61% $MnO_2$ and 16.38% iron oxide, as well as minor amounts of miscellaneous other impurities and moisture was crushed to pass a 200 mesh screen (Tyler standard). The crushed ore was intimately mixed with 5 parts by weight of potassium bifluoride for each part by weight of ore. The mixture was charged into a graphite crucible and placed in a furnace originally at 380° C. It was heated to a temperature of about 860° C. in about 90 minutes, after which it was permitted to cool in the furnace. The solid purplish residue was extracted with 40 parts by weight of warm water (60° F.) for each part of original ore by weight. Over 90% of the niobium originally in the ore was present as $K_2NbOF_5$ in the aqueous extract, which contained only trace amounts of tantalum. The solid residue was found by analysis to contain virtually 100% of the tantalum in the original ore. The niobium was recovered from the solution by evaporation and crystallization in the usual manner.

Example 2

Using the same ore, mixtures of ore and potassium acid fluoride were prepared in the same manner as in the preceding example. The temperature and the relative proportions of the two constituents were varied with the results shown below:

| Experiment | Ore, Parts By Weight | $KHF_2$, Parts By Weight | Temp., ° C. | Percent Nb Recovered in Soluble Portion | Remarks |
|---|---|---|---|---|---|
| 313-20 | 1 | 5 | 550-865 | 88 | Molten. |
| 313-32 | 1 | 5 | 380-860 | 90 | Do. |
| 313-34 | 1 | 5 | 400 | 75 | Semi-Molten. |
| 313-36 | 1 | 5 | 300 | 85 | Do. |
| 313-37 | 1 | 5 | 200 | | Apparently No Reaction. |
| 313-39 | 1 | 3 | 850 | 86 | Semi-Molten. |
| 313-42 | 1 | 5 | 700 | 84 | Molten. |
| 313-43 | 1 | 4 | 850 | 86 | Do. |
| 313-44 | 1 | 2 | 800 | 79 | Semi-Molten. |
| 313-45 | 1 | 5 | 850 | 86 | Molten. |

In each of the above the ore and bifluoride were hand-mixed and heated to fusion in a graphite crucible. The crucible was charged into a furnace already at about 400° C. (except in the case of experiments 313-36 and 313-37) and then brought up to the desired temperature. After remaining at the desired temperature for about one hour, the melt was allowed to cool in the furnace. The resulting solid was crushed when cooled and then digested with warm water. Whenever the suspension of the crushed product in water required adjustment to produce a pH of between about 2 and 3, an addition of sufficient HF was made to reach the desired acidity. After digestion at about 70° C. for about one hour, additional hot water was added to the slurry to further dilute same and digestion was continued for between 30 and 60 minutes, after which the slurry was permitted to cool. The insoluble residue was separated from the liquid by filtration. By chemical and spectrographic analysis it was established that the solid residue contained virtually all of the tantalum originally present in the ore, except for minor amounts lost in the processing, and that upwards of about 80% of the niobium originally present in the ore was separated into the filtrate from which it was readily recovered by crystallization as $K_2NbOF_5$.

Example 3

The same procedure as that described in Example 2 was followed using ore which had been crushed only to —40 mesh (Tyler standard). 81% of the niobium was recovered at a treatment temperature of 400° C., at which temperature the mixture was a light purple semi-molten mass. The reactants were $KHF_2$ (5 parts) and Nigerian ore (1 part).

Example 4

The procedure of Example 2 was repeated using a mixture of 1 part of Nigerian ore (—200 mesh), 2 parts of $KHF_2$, and 3 parts of $KF \cdot 2H_2O$, all parts by weight. After treatment for 1 hour at 850° C., 86% of the niobium values were recovered in the soluble extract.

Example 5

Instead of the Nigerian ore used in the preceding examples, a concentrate containing approximately 83.85% of niobium oxide and 11.3% of tantalum oxide was crushed as before and intimately mixed with $KHF_2$ in the proportions shown below. After the mixture was maintained at the fusion temperature for about 1 hour, the residue was extracted with a minimum amount of water. Over about 80% of the niobium present in the concentrate was recovered in the aqueous solution while all of the tantalum remained insoluble.

The results are tabulated below.

| Experiment | g. Concentrate | g. KHF$_2$ | Fusion Temp., °C. | Yield Soluble Nb | g. Product K$_2$NbOF$_5$ |
|---|---|---|---|---|---|
| 313–46 | 35 | 105 | 850 | 96 | 52 |
| 313–48 | 35 | 105 | 300 | 79 | 37 |
| 313–49 | 35 | 105 | 500 | 94.6 | 51.1 |

After the filtrate had been concentrated by evaporation at 50° C. until crystals appeared, the K$_2$NbOF$_5$ product was obtained by cooling the filtrate to a temperature of 25° C. Between 36 and 37 grams of the crystals were recovered in each instance. The additional yield in Experiments 313–46 and 313–49 was obtained by further cooling to 8° C. and recovery of additional crystalline product thereby. The product obtained was dried at 110° C.

*Example 6*

Example 5 was repeated at 975° C. and a much lower yield of niobium was obtained.

*Example 7*

A mixture was prepared consisting of 50 grams of KHF$_2$ and 150 grams of a finely divided ore containing about 43% niobium oxide, 27% tantalum oxide, and the balance largely iron oxide except for about 1% each of tin oxide and titanium oxide. The mixture was placed in a graphite crucible and charged into a 400° C. furnace. After about 1 hour at this temperature, the product consisted of about 180 grams of a purple-grey material. When cool, this was digested with 1200 ml. of water at 70° C. for 1 hour. HF was added as required to maintain the digestion liquid at a pH of 3. The digestion mixture was further diluted with a second 1200 ml. of hot water and digested further. The resulting mixture was filtered to separate it into 64.1 grams of residue containing the tantalum and iron originally present and 2150 ml. of liquid containing 86% of the niobium originally present in the starting material.

*Example 8*

88% of the niobium present in a starting material containing about 51% niobium oxide, 1% tantalum oxide, 1% tin oxide, 4–5% titanium oxide and the balance chiefly iron oxide was recovered by repeating the procedure of Example 7.

*Example 9*

Using the starting material of Example 6, with NaHF$_2$ substituted for KHF$_2$, no apparent reaction was observed when the mixture was heated to 600° C. By further heating to 800° C., a less complete separation of the niobium into the soluble fraction was obtained than heretofore. Since potassium carbonate was added to the aqueous filtrate in order to obtain the complex potassium fluoride of niobium, it appears that the use of other fluorides than those of potassium is likely to be less efficient than the use of KHF$_2$ and/or KF in the original charge.

*Example 10*

The starting material of Example 6 was mixed with NH$_4$F·HF in the proportions of 50 parts of the concentrate to 123 parts of ammonium bifluoride. When heated to 175° C. the mixture was melted and copious white fumes were evolved. A moderate recovery of niobium, free from tantalum, was obtained in the soluble filtrate.

*Example 11*

Another ore containing 57.93% niobium oxide and 18.84% tantalum oxide was treated at 400° C. in the manner described in Example 1. From the purple fusion product, 88% of the niobium in the starting material was recovered as K$_2$NbOF$_5$.

From the above examples it will be evident that the process described is applicable to starting materials having widely different Nb/Ta ratios and that the recovery of a substantially pure niobium compound is not prevented by the presence of the impurities usually associated with tantalite or columbite ores and concentrates. It will be further noted that complete fusion is not necessary to obtain the desired results, sintering or partial fusion having been shown to result in satisfactory yields.

Having now described our invention in accordance with the patent statutes, we claim:

1. A process for the treatment of oxidic materials containing oxides of both tantalum and niobium for obtaining a separation of the niobium values from the tantalum values which comprises: forming a dry mixture of the primary material containing oxides of both tantalum and niobium with a fluoride of the group consisting of the alkali metal bifluorides and ammonium bifluoride, mixtures of said bifluorides, and mixtures of at least one of said bifluorides with alkali metal normal fluorides; heating the mixture to a temperature at least sufficient to melt a bifluoride in the mixture and to convert the niobium values to a water-soluble complex fluoride and the tantalum values to a complex fluoride having a solubility in water which is less than the solubility of the complex fluoride of niobium in water and separating the two fluorides by extraction with an aqueous medium.

2. A process for the treatment of oxidic materials containing oxides of both tantalum and niobium for obtaining a separation of the niobium values from the tantalum values which comprises: forming a dry mixtures of the primary material containing oxides of both tantalum and niobium with an alkali metal bifluoride; heating the mixture to a temperature at least sufficient to melt the bifluoride in the mixture and to convert the niobium values to a water-soluble complex fluoride and the tantalum values to a complex fluoride having a solubility in water which is less than the solubility of the complex fluoride of niobium in water and separating the two fluorides by extraction with an aqueous medium.

3. A process for the treatment of oxidic materials containing oxides of both tantalum and niobium for obtaining a separation of the niobium values from the tantalum values which comprises: forming a dry mixture of the primary material containing oxides of both tantalum and niobium with a fluoride of the group consisting of the alkali metal bifluorides and ammonium bifluoride, mixtures of said bifluorides, and mixtures of at least one of said bifluorides with alkali metal normal fluorides; heating the mixture to a temperature at least sufficient to melt a bifluoride in the mixture and for a time sufficient to convert the niobium values to a water-soluble complex fluoride and the tantalum values to a complex fluoride having a solubility in water which is less than the solubility of the complex fluoride of niobium in water and separating the two fluorides by extraction with water.

4. A process for the treatment of oxidic materials containing oxides of both tantalum and niobium for obtaining a separation of the niobium values from the tantalum values which comprises: forming a dry mixture of the primary material containing oxides of both tantalum and niobium with a fluoride of the group consisting of the alkali metal bifluorides and ammonium bifluoride, mixtures of said bifluorides, and mixtures of at least one of said bifluorides with alkali metal normal fluorides; heating the mixture to a temperature at least sufficient to melt a bifluoride in the mixture and to convert the niobium values to a water-soluble complex fluoride and the tantalum values to a complex fluoride having a solubility in water which is less than the solubility of the complex fluoride of niobium in water; digesting the resulting product with an aqueous medium; and separately recovering the liquid phase containing the water soluble complex fluoride of niobium from the solid residue containing the tantalum fluoride.

5. A process for the treatment of oxidic materials containing oxides of both tantalum and niobium for obtaining a separation of the niobium values from the tantalum values which comprises: forming a dry mixture of the primary material containing oxides of both tantalum and niobium with a fluoride of the group consisting of the alkali metal bifluorides and ammonium bifluoride, mixtures of said bifluorides, and mixtures of at least one of said bifluorides with alkali metal normal fluorides; heating the mixture to a temperature at least sufficient to melt a bifluoride in the mixture and to convert the niobium values to a water-soluble complex fluoride and the tantalum values to a complex fluoride having a solubility in water which is less than the solubility of the complex fluoride of niobium in water; digesting the resulting product with an aqueous medium maintained at a pH of about 3; and separately recovering the niobium as a complex fluoride dissolved in the liquid phase of the digestion product and the tantalum as a complex fluoride remaining in the solid phase of the digestion product.

6. A process for the treatment of oxidic materials containing oxides of both tantalum and niobium for obtaining a separating of the niobium values from the tantalum values which comprises: forming a dry mixture of the primary material containing oxides of both tantalum and niobium with a fluoride of the group consisting of the alkali metal bifluorides and ammonium bifluoride, mixtures of said bifluorides, and mixtures of at least one of said bifluorides with alkali metal normal fluorides; heating the mixture to a temperature at least sufficient to melt a bifluoride in the mixture and to a temperature not greater than 900° C. to convert the niobium values to a water-soluble complex fluoride and the tantalum values to a complex fluoride having a solubility in water which is less than the solubility of the complex fluoride of niobium in water and separating the two fluorides by extraction with an aqueous medium.

7. A process for the treatment of oxidic materials containing oxides of both tantalum and niobium for obtaining a separation of the niobium values from the tantalum values which comprises: forming a dry mixture of the primary oxidic material containing oxides of both tantalum and niobium with potassium bifluoride; heating the mixture to a temperature at least sufficient to melt the bifluoride in the mixture and to convert the niobium oxide to a complex fluoride and the tantalum oxide to a complex fluoride; extracting the resulting product with an aqueous medium maintained at a pH of about 3 to form a solution containing the more soluble niobium complex fluoride and a solid residue containing the less soluble tantalum complex fluoride and separating the solution from the solid residue, to separately recover the niobium values in the primary material.

8. The process of claim 7 in which the mixture is formed of about 2.5 parts by weight of $KHF_2$ for each part by weight of primary oxidic material.

9. A process for separating tantalum values and niobium values from ores and concentrates thereof containing tantalum values and niobium values which comprises: mixing the material containing tantalum values and niobium values with at least one fluoride from the group consisting of alkali metal bifluorides and ammonium bifluorides, mixtures of said bifluorides, and mixtures of at least one of said bifluorides wth an alkaili metal normal fluoride; heating said mixture to a temperature greater than the temperature at which the bifluoride melts but insufficient to fuse the mixture to form a liquid melt thereof; maintaining the semi-molten mass at said elevated temperature for a time sufficient to convert the tantalum and niobium content of said original material to complex fluorine compounds thereof; and recovering the more soluble niobium-fluorine compound from said mixture by leaching with water leaving the less soluble tantalum-fluorine compound in the undissolved residue.

References Cited in the file of this patent

UNITED STATES PATENTS 2,859,098   Ruhoff et al. _____ Nov. 4, 1958
2,859,099   Ruhoff et al. _____ Nov. 4, 1958

OTHER REFERENCES

Hopkins: "Chemistry of the Rarer Elements," D. C. Heath and Co., N.Y., 1923, pages 226 and 227.

Hampel: "Rare Metals Handbook," Reinhold Publ. Co., N.Y., 1954, pp. 390–1.

Thorpe et al.: "Thorpe's Dictionary of Applied Chemistry," 4th ed., vol. III, 1939, pages 310–311.

Mellor: "Comprehensive Treatise on Inorganic and Theoretical Chemistry," vol. II, 1922, page 516.

Balke: On Electrochemical Society, Preprint 85–3, 1944, pp. 25–30.

Thorpe: "Dictionary of Applied Chemistry," vol. V, 1916, p. 401.